US006993743B2

(12) United States Patent
Crupi et al.

(10) Patent No.: US 6,993,743 B2
(45) Date of Patent: Jan. 31, 2006

(54) METHOD AND APPARATUS FOR DEVELOPING ENTERPRISE APPLICATIONS USING DESIGN PATTERNS

(75) Inventors: John Crupi, Bethesda, MD (US); Deepak Alur, Fremont, CA (US); Daniel Malks, Arlington, VA (US)

(73) Assignee: Sun Microsystems, Inc., Palo Alto, CA (US)

( * ) Notice: Subject to any disclaimer, the term of this patent is extended or adjusted under 35 U.S.C. 154(b) by 491 days.

(21) Appl. No.: 09/872,362

(22) Filed: Jun. 1, 2001

(65) Prior Publication Data

US 2002/0073396 A1  Jun. 13, 2002

Related U.S. Application Data

(60) Provisional application No. 60/209,143, filed on Jun. 3, 2000.

(51) Int. Cl.
   *G06F 9/44* (2006.01)
(52) U.S. Cl. .................. 717/102; 717/107; 717/120
(58) Field of Classification Search ........ 717/100–109, 717/114–120; 707/203
   See application file for complete search history.

(56) References Cited

U.S. PATENT DOCUMENTS

| | | | | |
|---|---|---|---|---|
| 5,930,512 A | * | 7/1999 | Boden et al. ............... 717/102 |
| 6,023,578 A | * | 2/2000 | Birsan et al. ............... 717/105 |
| 6,038,393 A | * | 3/2000 | Iyengar et al. ............. 717/104 |
| 6,134,706 A | * | 10/2000 | Carey et al. ................ 717/102 |
| 6,484,310 B1 | * | 11/2002 | Przybylski et al. ......... 717/101 |
| 6,529,909 B1 | * | 3/2003 | Bowman-Amuah .......... 707/10 |
| 6,539,396 B1 | * | 3/2003 | Bowman-Amuah ..... 707/103 R |
| 6,550,057 B1 | * | 4/2003 | Bowman-Amuah ......... 717/126 |
| 6,571,247 B1 | * | 5/2003 | Danno et al. ............... 707/100 |
| 6,615,253 B1 | * | 9/2003 | Bowman-Amuah ......... 709/219 |
| 6,718,535 B1 | * | 4/2004 | Underwood ................ 717/101 |
| 6,788,688 B2 | * | 9/2004 | Trebes, Jr. ............... 370/395.1 |
| 6,842,906 B1 | * | 1/2005 | Bowman-Amuah ......... 719/330 |
| 6,854,107 B2 | * | 2/2005 | Green et al. ................ 717/117 |
| 6,877,153 B2 | * | 4/2005 | Konnersman ............... 717/100 |
| 6,898,791 B1 | * | 5/2005 | Chandy et al. ............. 719/314 |
| 6,901,588 B1 | * | 5/2005 | Krapf et al. ................ 717/164 |

OTHER PUBLICATIONS

Rational Software Corporation. Using Rose. Mar. 2000. Rational Software Corporation. 2000e Revision 7.0. i-254.*
Chambers et al, "A debate on language and tool support for design pattern", ACM POPL Jan. 2000, pp 277-289.*
Schmidt, "Using design patterns to develop reusable object orienetd coomunciation software", Comm. of the ACM, Oct. 1995, vol. 38, No. 10, pp 65-74.*
Noble et al, Metaphor and metanymy in object oriented design pattern , ACM, Australian computer sci comm. Proc. 25, vol. 4.*

(Continued)

*Primary Examiner*—Anil Khatri
(74) *Attorney, Agent, or Firm*—Kent A. Lembke; William J. Kubida; Hogan & Hartson LLP

(57) ABSTRACT

The present invention provides a method and apparatus for developing enterprise applications using design patterns. Over time, different types of enterprise applications have been developed and implemented by various software developers for different purposes. The present invention determines the purpose of the software that is needed by the developer and obtains a design pattern to solve the problem that is in accord with the best practices and patterns derived from these implementations. In turn a developer can rely on the present invention as a tool to develop and implement applications in a three-tier or multi-tier computer architecture.

42 Claims, 17 Drawing Sheets

OTHER PUBLICATIONS

The ACM Digital Library, ACM PORTAL pp 1-6.*
Hannemann et al, "Design pattren implementation in Jaa and AspectJ", ACM OOPSLA, pp 161-173, Nov. 2002.*
Mapelsden et al, "Design pattren and instantiating using DPML", AMC, Australian Com. Soc. TOOLS, vol. 10, pp 3-11, 2002.*
Mak et al, "Precise modeing of design patterns in UML", IEEE ICSE, pp 252-261, 2004.*
Noble et al, "Metaphor and metonymy in object oriented design patterns", ACM ACS, vol. 4, pp 187-195, 2001.*

* cited by examiner

METHOD AND APPARATUS FOR DEVELOPING ENTERPRISE APPLICATIONS USING DESIGN PATTERNS

Applicant claims priority to provisional patent application No. 60/209,143 filed Jun. 3, 2000.

BACKGROUND OF THE INVENTION

1. Field of the Invention

The present invention relates to enterprise applications, and more specifically to developing enterprise applications using design patterns.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Recently, an application architecture that is becoming widely used in the computing industry, specifically in an Internet environment, is the three-tier application architecture. The three tier architecture includes a database tier that includes a database server, an application tier that includes an application server and application logic (i.e., software application programs, functions, etc.), and a client tier. The application server responds to application requests received from the client, a request for a software applet for example. The application server forwards data requests to the database server.

An enterprise application is defined as an application used by a business for a business purpose. An enterprise's application (e.g., a scheduling, accounting or personnel application) may involve all three tiers as data that is used by the application maybe stored in a database. The computer software that enables execution of the enterprise application usually resides in the application tier. Developing this software has been a difficult task because there are no uniform standards which define the best way to approach a solution to a specific problem when working in the application tier. Before further discussing the problems associated with software development in the application tier, an overview of the three-tier computer architecture and an overview of the specific types of programming languages used in the application tier are provided.

Overview of the Three-Tier Architecture

FIG. 1 provides an overview of a three-tier architecture. Client tier 100 typically consists of a computer system that provides a graphic user interface (GUI) generated by a client 110, such as a browser or other user interface application. Conventional browsers include Internet Explorer and Netscape Navigator, among others. Client 110 generates a display from, for example, a specification of GUI elements (e.g., a file containing input, form, and text elements defined using the Hypertext Markup Language (HTML)) and/or from an applet (i.e., a program such as a program written using the Java™ programming language, or other platform independent programming language, that runs when it is loaded by the browser).

Further application functionality is provided by application logic managed by application server 120 in application tier 130. The apportionment of application functionality between client tier 100 and application tier 130 is dependent upon whether a "thin client" or "thick client" topology is desired. In a thin client topology, the client tier is limited in functionality, in that the end user's computer on the client tier is used primarily to display output and obtain input, while computing takes place in the application tier. A thick client topology, on the other hand, uses a more conventional general purpose computer having processing, memory, and data storage abilities. Database tier 140 contains the data that is accessed by the application logic in application tier 130. Database server 150 manages the data, its structure and the operations that can be performed on the data and/or its structure.

Application server 120 can include applications such as a corporation's scheduling, accounting, personnel and payroll applications, for example. Application server 120 manages requests for the applications that are stored therein. Application server 120 can also manage the storage and dissemination of production versions of enterprise application logic (i.e., the versions that are currently being used by the corporate users). Database server 140 manages the database(s) that manage data for applications. Database server 140 responds to requests to access the scheduling, accounting, personnel and payroll applications' data, for example.

Connection 160 is used to transmit enterprise data between client tier 100 and application tier 150, and may also be used to transfer the enterprise application logic to client tier 100. The client tier can communicate with the application tier via, for example, a Remote Method Invocator (RMI) application programming interface (API) available from Sun Microsystems™. The RMI API provides the ability to invoke methods, or software modules, that reside on another computer system Parameters are packaged and unpackaged for transmittal to and from the client tier. Connection 170 between application server 120 and database server 150 represents the transmission of requests for data and the responses to such requests from applications that reside in application server 120.

Elements of the client tier, application tier and database tier (e.g., client 110, application server 120, and database server 150) may execute within a single computer. However, in a typical system, elements of the client tier, application tier and database tier may execute within separate computers interconnected over a network such as a LAN (local area network) or WAN (wide area network). The application tier might also be divided into multiple other tiers, such as a web tier that generates presentation logic and accepts user responses from clients. The middle tier might also contain a business tier that handles the core business logic of an application and provides the necessary interfaces to the underlying business service components.

Platform Independent Programming Languages

A specific application for a three-tier computer architecture uses a platform independent programming language. One example of a platform independent programming language is the Java™ programming language developed by Sun Mcrosystems, however other platform independent programming languages exist as well and have similar application in a three-tier computing architecture.

One type of platform independent programming language comprises a collection of components. The components maybe implemented as one or more instances of object classes in accordance with known object-oriented programming practices, or the components may be implemented under one or more component model definitions. Several component model definitions are currently available, such as COM, CORBA, and javaBeans™.

Each component model provides for encapsulation of related functions and data structures into individual components, similar to what occurs under a standard object-oriented programming (OOP) approach. The particular mechanisms by which the components are managed and interact are defined according to the respective component model. Bridges may be constructed which allow components designed under different component model definitions to interact within a single application. Interaction is typically performed through a set of methods implemented by the component. These sets of methods are referred to as "interfaces" in some component models. The public methods by which OOP object classes interact are often presented in the form of application programming interface (API) definitions.

To provide a better understanding of encapsulation of related data structures and methods, an overview of object-oriented programming is provided below.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set.sub.—salary" method. Instances of the employee object class can be created, or instantiated for each employee in an organization. Each object instance is said to be of type "employee." Each employee object instance includes "name" and "salary" instance variables and the "set.sub.—salary" method. The values associated with the "name" and "salary" variables in each employee object instance contain the name and salary of an employee in the organization. A message can be sent to an employee's employee object instance to invoke the "set.sub.—salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. The parent class is also referred to as a "superclass." Each subclass in the hierarchy may add to or modify the behavior specified by its parent class. Some object-oriented programming languages support multiple inheritance where a subclass may inherit a class definition from more than one parent class. Other programming languages, such as the Java programming language, support only single inheritance, where a subclass is limited to inheriting the class definition of only one parent class. The Java programming language also provides a mechanism known as an "interface" which comprises a set of constant and abstract method declarations. An object class can implement the abstract methods defined in an interface.

An object is a generic term that is used in the object-oriented programming environment to refer to a module that contains related code and variables. A software application can be written using an object-oriented programming language whereby the program's functionality is implemented using objects. As previously discussed, the encapsulation provided by objects in an object-oriented programming environment maybe extended to the notion of components under a component model definition.

Implementation in a Programming Language Using Java Technology

An embodiment of the platform independent programming language that uses a three-tier computer architecture is implemented in the Java programming language. The Java programming language is an object-oriented programming language with each program comprising one or more object classes. Unlike many programming languages, in which a program is compiled into machine-dependent, executable program code, classes using Java technology are compiled into machine independent bytecode class files. Each class contains code and data in a platform-independent format called the class file format. The computer system acting as the execution vehicle supports the Java technology runtime environment. The runtime environment contains a program called a virtual machine, which is responsible for executing the code in classes.

Applications maybe designed as standalone Java technology applications, or as "applets" which are identified by an applet tag in an HTML document, and loaded by a browser application. The class files associated with an application or applet may be stored on the local computing system, or on a server accessible over a network Each class is loaded into the Java technology runtime environment, as needed, by the "class loader."

Java technology classes are loaded on demand from the network (stored on a server), or from a local file system, when first referenced during an application or applet's execution. The runtime environment locates and loads each class file, parses the class file format, allocates memory for the class's various components, and links the class with other already loaded classes. This process makes the code in the class readily executable by the virtual machine.

Java technology classes may also be incorporated into Java technology components referred to as "JavaBeans". Javabeans are designed in accordance with the JavaBean API Specification to allow for component-based application building. Bridges may be used with JavaBeans to allow Javabeans to be used in other component model environments, such as OLE/COM and CORBA.

The Java technology example partitions the work needed to implement a multi-tier service into two parts: the business and presentation logic to be implemented by the developer, and the standard system services provided by the Java technology platform. This partitioning is shown in FIG. 3. The developer can rely on the platform to provide the solutions for the systems level problems associated with developing a middle-tier service. In addition, the three-tier model avoids the drawback of having to download the application logic to each user's client computer.

Unfortunately, in the development of three-tier applications, the development of the client software, particularly in the middle layer, is left without formal guidelines. Without formal guidelines, one current scheme for developing application software in the middle tier is for the developer to consult with the client to define the problem Once the problem is defined, the developer generates a computer program configured to execute in the middle tier (e.g., an enterprise application). Then, when the next client consults with the developer, the process repeats. Thus, each time a client has a problem, the solution is generated in an ad hoc and non-uniform fashion.

Using this scheme, often a developer would solve a customer's problem in one case, and another developer would have to re-create the same solution for a different customer who had the same problem. Without a way to obtain specific and provenly effective solutions that have particular use, software development in a multi-tier environment was disadvantaged.

SUMMARY OF THE INVENTION

The present invention provides a method and apparatus for developing enterprise applications using design patterns. Over time, different types of enterprise applications have been developed and implemented by various software developers for different purposes. The present invention determines the purpose of the software that is needed by the developer and obtains a design pattern to solve the problem that is in accord with the best practices and patterns derived from these implementations. In turn a developer can rely on the present invention as a tool to develop and implement applications in a three-tier or multi-tier computer architecture.

In one embodiment, the invention provides design patterns for use with a platform independent programming language. The types of problems are classified as presentation, business, service, or integration. Specific types of problems may be hybrids of the three categories. The user is prompted as to what type of problem they are trying to solve. Once determining the problem, the invention suggests a design pattern to facilitate a solution to the problem. The design pattern is essentially a blueprint that helps the developer design the program they need in a manner that has already been proven to be effective for other similar solutions. Thus, the invention eliminates the ad hoc solutions that were developed using prior art schemes.

One design pattern is called the mediator view. In this pattern, remote, web-enabled access to business services is provided. Responses require server side processing for the formulation of a dynamic presentation. Another design pattern is called the service to workers. In this pattern, remote, web-enabled access to business services is provided. A dispatcher delegates responsibilities to one or more helpers before dispatching to a view, which dynamically formulates a presentation response.

In another design pattern, called the mutable conversational business entity, a business object is represented using an entity. The business entity can be designed such that it has the responsibility of persistence and the ability to manage its attributes. The business logic can be coded in a separate session layer instead of the entity. The session layer can contain the ability to locate and manage the business entity.

In another design pattern, called the mutable conversational aggregator business entity, aggregation service for the business entity are provided in order to attribute values into a single class. This enables the client to request the business entity to provide the entire values of its attributes packaged as a single class, thereby reducing the "chattiness" of the client (i.e., reduced remote calls from the client to the server).

The immutable business object builder design pattern builds a business object using one or more business entity objects as the source. The business object is then shipped out to the client to reduce the number of network calls required to get the different attribute values from one or more business entity objects. Once the business object is shipped, the client obtains a local copy of it and can use it for displaying or read only purposes.

The mutable conversational value object business entity pattern is configured to update persistent data using the value object pattern. Value objects are a preferable way to transfer data from a business entity to a client. By definition, value objects are fine grained and immutable. Another design pattern, called the immutable conversational business list handler provides a business list handler to which the user can make business calls which returns a set or subset of the results. The client can then traverse forward and backward through the result list.

The business delegate design pattern provides a client interface to business services. The service workflow controller design pattern provides the ability for enterprise Java Bean business services to be participants in a workflow process. Finally, the service island proxy integrator provides connectivity between enterprise Java Beans and services which are not network accessible.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Figure 1:
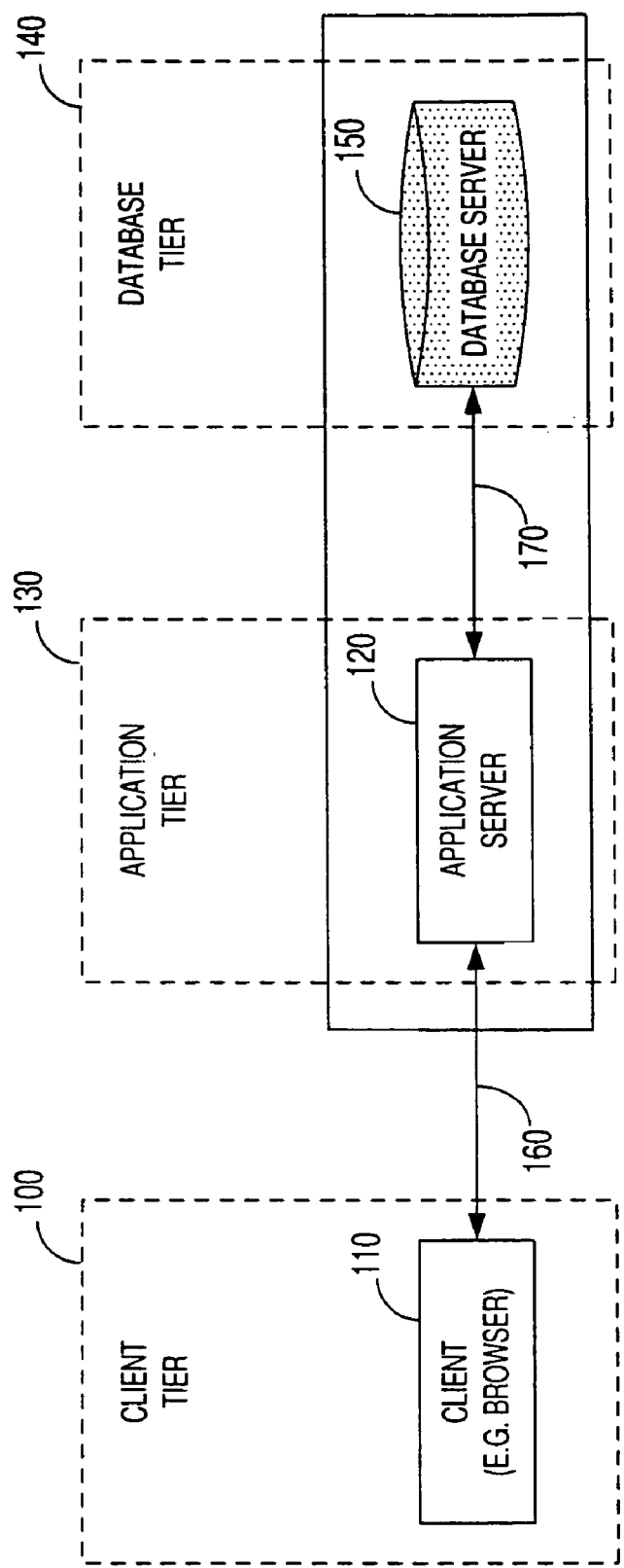
FIG. 1 is an overview of a three-tiered application architecture.

The invention is a method and apparatus for developing enterprise applications using design patterns. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Over time, different types of enterprise software applications have been developed and implemented. The present invention determines the purpose of the software needed by the developer and obtains a design pattern in accord with the best practices and patterns derived from these implementations. In turn, a developer, can rely on the present invention to develop and implement applications in a three-tier or multi-tier computer architecture using a platform independent programming language.

The present invention refers to "design patterns". A design pattern is a blueprint that a developer can use to design a program that solves a problem in a manner that has proven to be successful for other similar situations. Design patterns are documents which describe common design challenges, and solutions to these challenges that have worked well in the past. The documents typically contain descriptions of opposing forces in the design situation, a suggested solution, criteria for when the solution is applicable, and likely impact the solution will have on the target system. A design pattern may have one or more "instances", or versions of the design pattern.

Pattern Template

In one embodiment of the invention, the design patterns are structured according to a defined pattern template. The pattern template consists of sections as follows:

Context: Sets the environment under which the pattern exists.

Problem: Describes the design issues faced by the developer.

Forces: Lists the reasons and motivations that affect the problem and the solution. The list of forces high-lights the reasons why one might choose to use the pattern and provides a justification for using the pattern.

Solution: Describes the solution approach briefly and the solution elements in detail. The solution section contains two subsections:

Structure: Uses diagrams to show the basic structure of the solution. The diagrams present the dynamic mechanisms of the solution. There is a detailed explanation of the participants and collaborations.

Strategies: Describes different ways a pattern may be implemented. Where a strategy can be demonstated using code, code may be provided in this section or in a separate sample code section.

Consequences: Here we describe the pattern trade-offs. (Generally, this section focuses on the results of using a particular pattern or its strategy, and notes the pros and cons that may result from the application of the pattern.)

Sample Code: his section includes example implementations and code listings for the patterns and the strategies.

Related Patterns: This section lists other relevant patterns from other sources.

Figure 17:
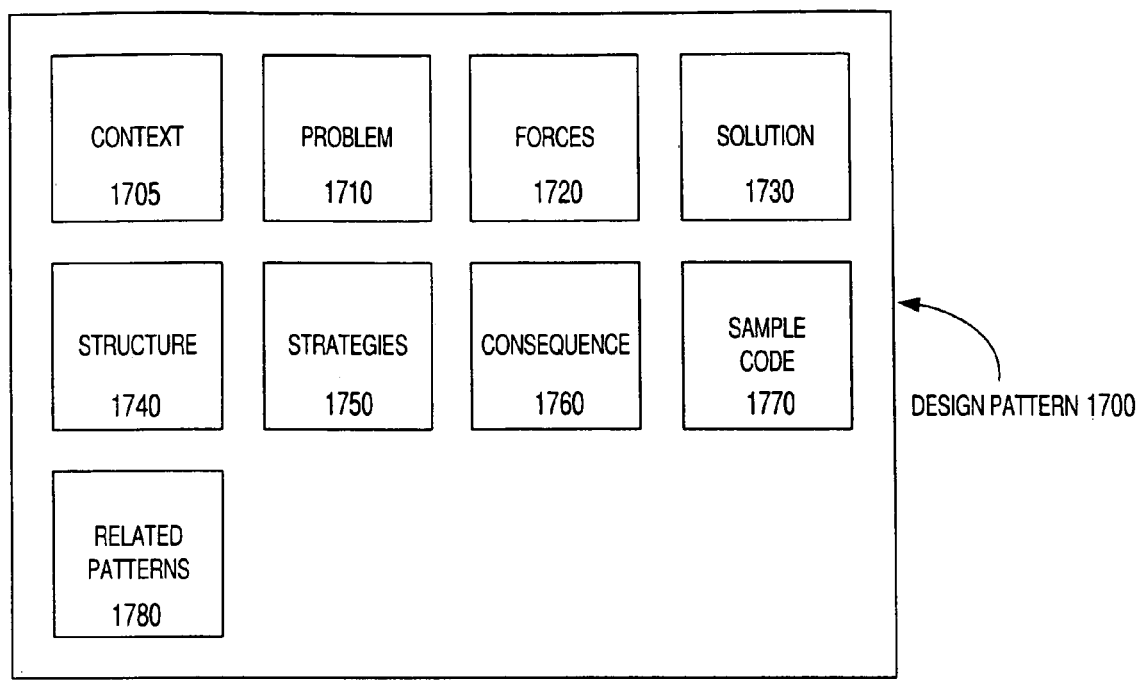
FIG. 17 shows a design pattern template according to an embodiment of the present invention.

FIG. 17 shows the requirements for a patterns according to one embodiment. Design pattern 1700 includes a context block 1705, a problem block 1710, a forces block 1720, a solution block 1730, a structure block 1740, a strategies block 1750, a consequences block 1760, a sample code block 1770, and a related patterns block 1780.

Determining the Type of Design Pattern

A non-exhaustive list that provides examples of the general categories of design patterns include presentation, business, service and integration. Some design patterns are hybrids of these categories, including a business/service hybrid, a presentation/business hybrid, and a business/integration hybrid.

Figure 2:
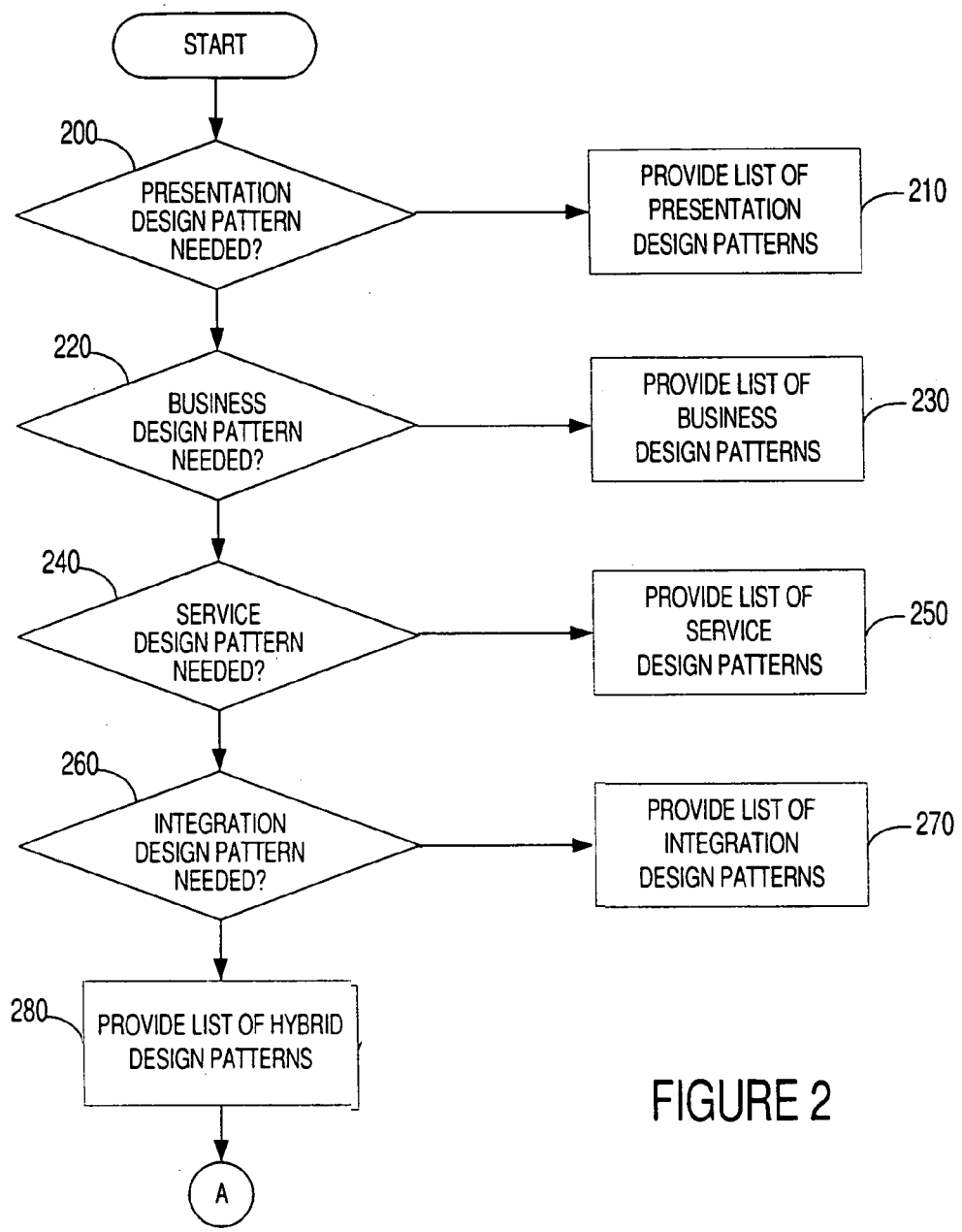
FIG. 2 is an embodiment of the present invention that determines the appropriate type of design pattern.

One embodiment of the invention determines the category of the design pattern before presenting specific design pattern solutions. This embodiment is shown in FIG. 2. At step 200, it is determined whether a presentation design pattern is needed. If it is, a list of available presentation design patterns is presented to the user at step 210. If a presentation pattern is not needed, then at step 220, it is determined whether a business design pattern is needed by the user. If a business design pattern is needed, a list of such patterns is presented to the user at step 230.

If a business class of design pattern is not needed at step 220, it is determined whether a service type design pattern is needed at step 240. If it is, a list of such design patterns is presented to the user at step 250. If it is not, it is determined whether an integration class of design pattern is needed by the user at step 260. If it is, a list of such patterns is presented to the user at step 270. If an integration class design pattern is not needed, then a hybrid type design pattern is provided at step 280.

Figure 3:
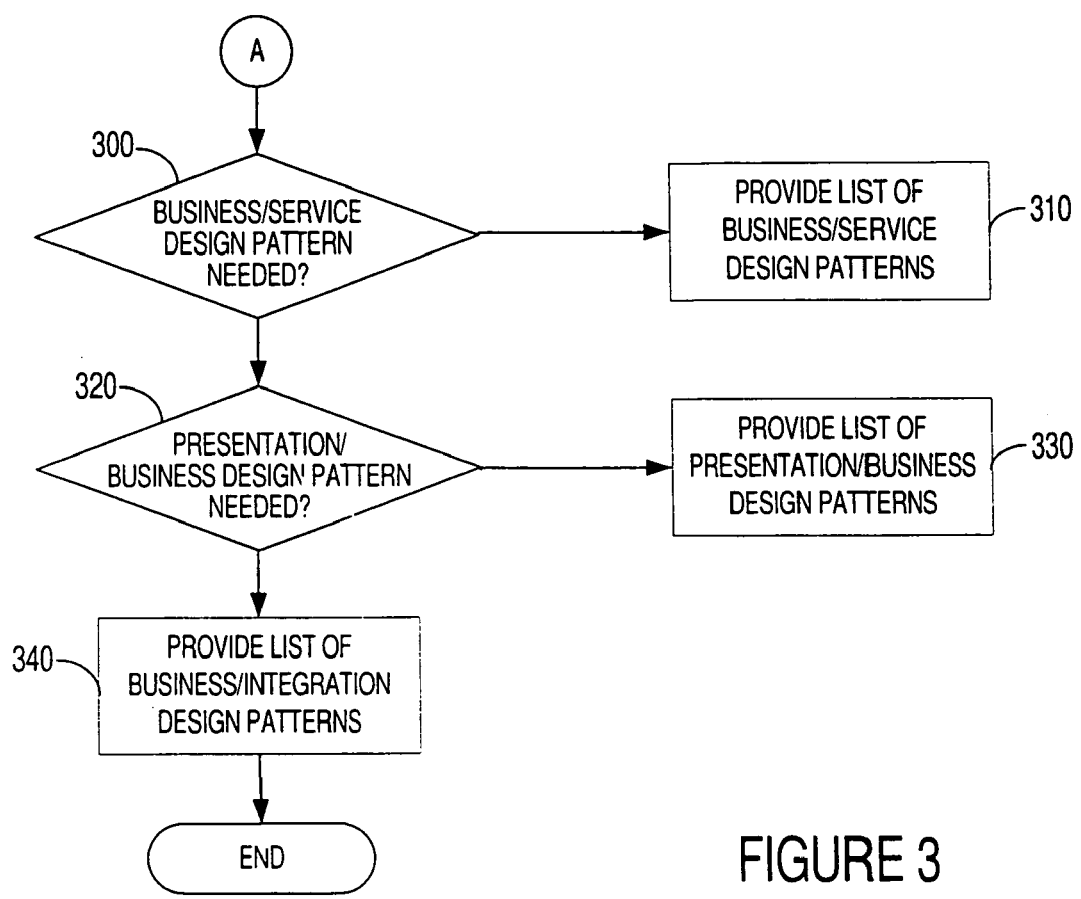
FIG. 3 is an embodiment of the present invention that determines the appropriate type of design pattern if a hybrid design pattern is needed.

If a hybrid type design pattern is provided at step 280 of FIG. 2, then the process described in the flowchart of FIG. 3 takes place. FIG. 3 is a flowchart for providing a hybrid type design pattern according to an embodiment of the present invention. At step 300, it is determined whether a business/service design pattern is needed. If it is, then the business/service design patterns are presented to the user at step 310. Otherwise, it is determined whether a presentation/business pattern is needed at step 320. If it is, the available presentation/business patterns are provided at step 330. Otherwise, at step 340, the business/integration hybrid design patterns are provided.

Figure 16:
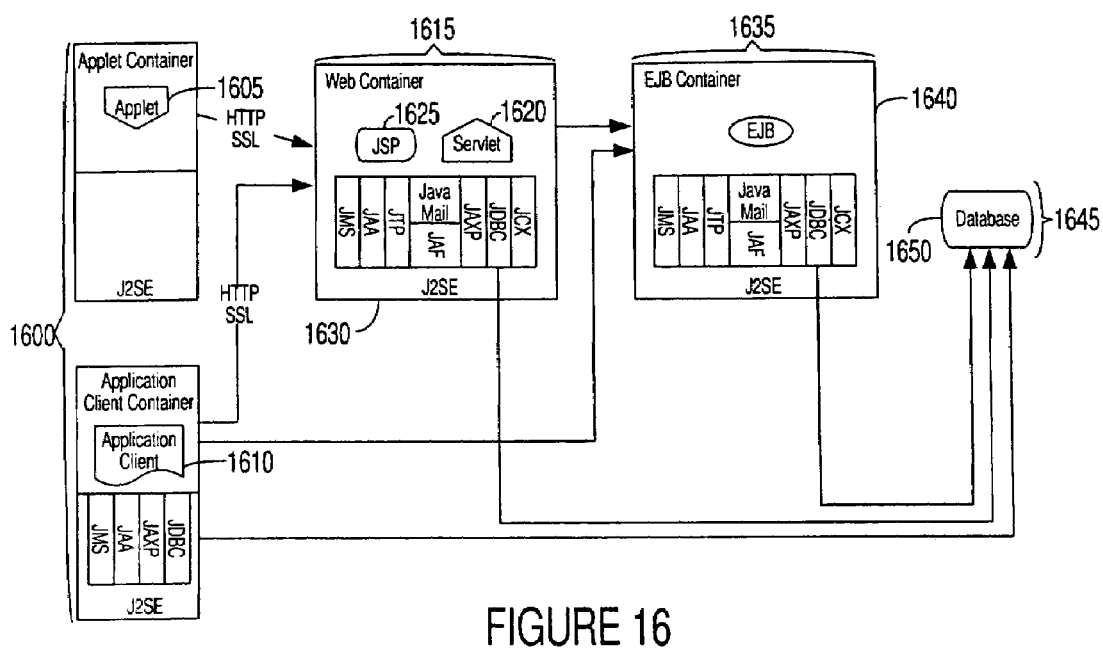
FIG. 16 shows an architecture for use with one embodiment of the present invention.

An overview of one embodiment of an architecture for use with the present invention is instructive when describing the classes of design pattern. The architecture is shown in FIG. 16. A client tier 1600 interacts with the user and displays information from the system to the user. In one embodiment, the Java 2 Enterprise Edition™ (J2EE) is used. The J2EE platform supports different types of clients, including HTML clients, Java Applets 1605, and Java applications 1610.

A web tier 1615 generates presentation logic and accepts user responses from presentation clients, which are typically HTML clients, Java applets, and other web clients. Based on the received client request, the presentation tier generates the appropriate response to a client request that it receives. In the J2EE platform, servlets 1620 and JSPs 1625 in a web container 1630 implement this tier. Presentation design patterns are implemented in this tier.

Business design patterns are implemented in a business tier 1635. Business tier 1635 handles the core business logic of the application. The business tier 1635 provides the necessary interfaces to the underlying business service components and service type design patterns. The business components are typically implemented as Enterprise Java Bean (EJB) components with support for an EJB container 1640 in J2EE. The EJB container 1640 facilitates the component life cycle and manages persistence, transactions, and resource allocation.

An enterprise information system (EIS) tier 1645 is responsible for enterprise information systems, including database systems 1650, transaction processing systems, legacy systems, and enterprise resource planning systems. The EIS tier 1645 is the point where J2EE applications integrate with non-J2EE or legacy systems, for instance using integration type design patterns.

Design Pattern Instances

The following are examples of design pattern instances for various design pattern types.

Mediator View

Figure 4:
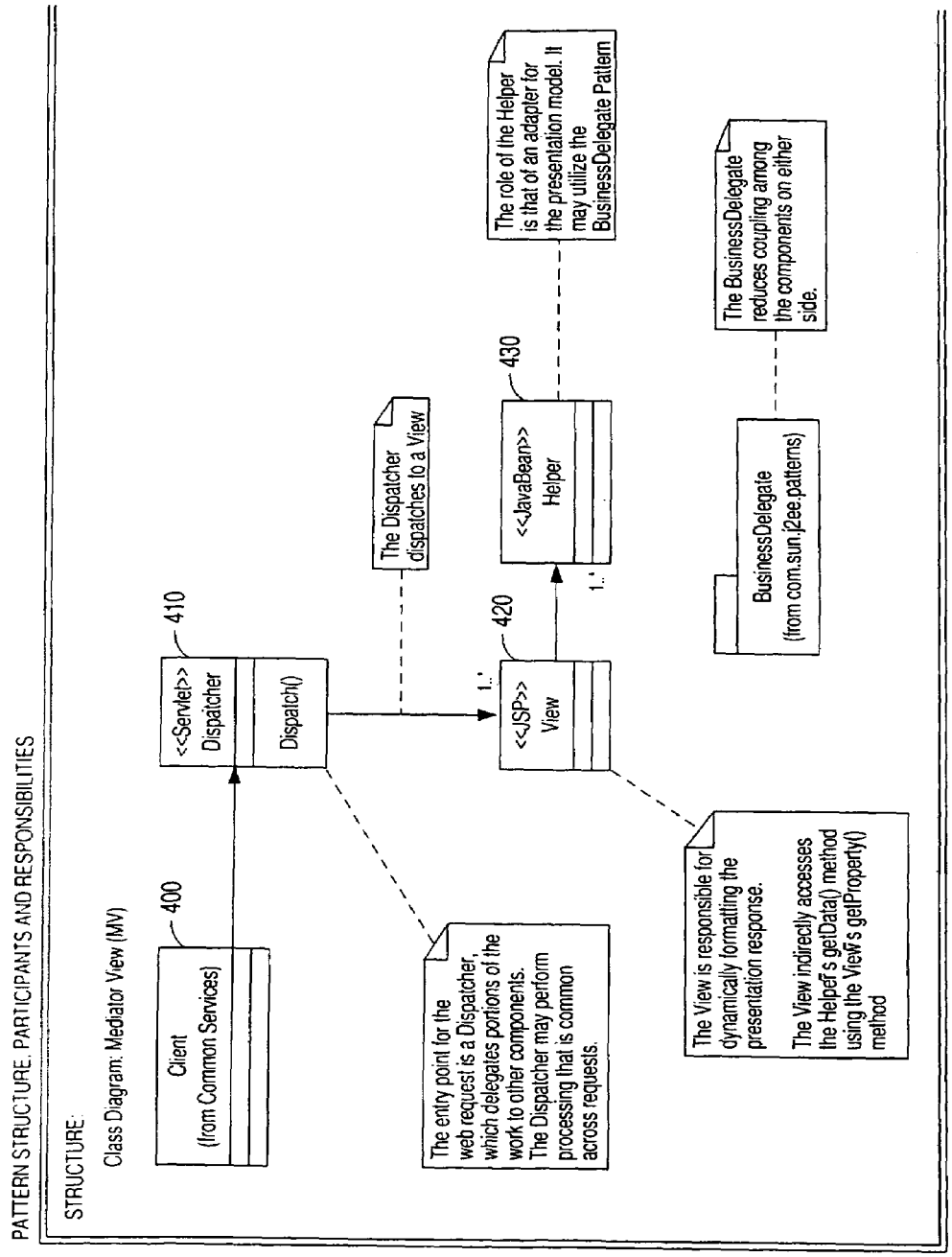
FIG. 4 is a flowchart of the operation of the mediator view design pattern according to an embodiment of the present invention.

The mediator view is an instance of presentation type design pattern. The context of use of the mediator view is when response require server side processing for the formulation of a dynamic presentation. It is configured to solve the problem of providing remote, web-enabled access to business services. The operation of the mediator view design pattern solution is described in the flowchart of FIG. 4. First, a user makes a web request at step 400. The entry point for the request is a dispatcher, which delegates portions of the work to other components at step 410. The dispatcher may perform common processing before dispatching the request. The dispatcher dispatches a view at step 420, which dynamically formulates the presentation response.

The view delegates to one or more helpers at step 430 before dynamically formatting the presentation. The role of the helper is that of an adapter for the presentation model. The helper provides for a cleaner separation of roles, as a developer can maintain programming code and a web-production individual can maintain the presentation. The helper may utilize related patterns, such as the business delegate pattern to initiate the retrieval of required data. The business delegate reduces coupling among components on either side.

In this design pattern, the dispatcher is the initial point of contact for the request. The dispatcher dispatches the view. The view delegates to one or more helpers. Helpers may delegate to a business delegate. No data access code is encapsulated within the dispatcher, view, or helper.

Service To Workers

Figure 5:
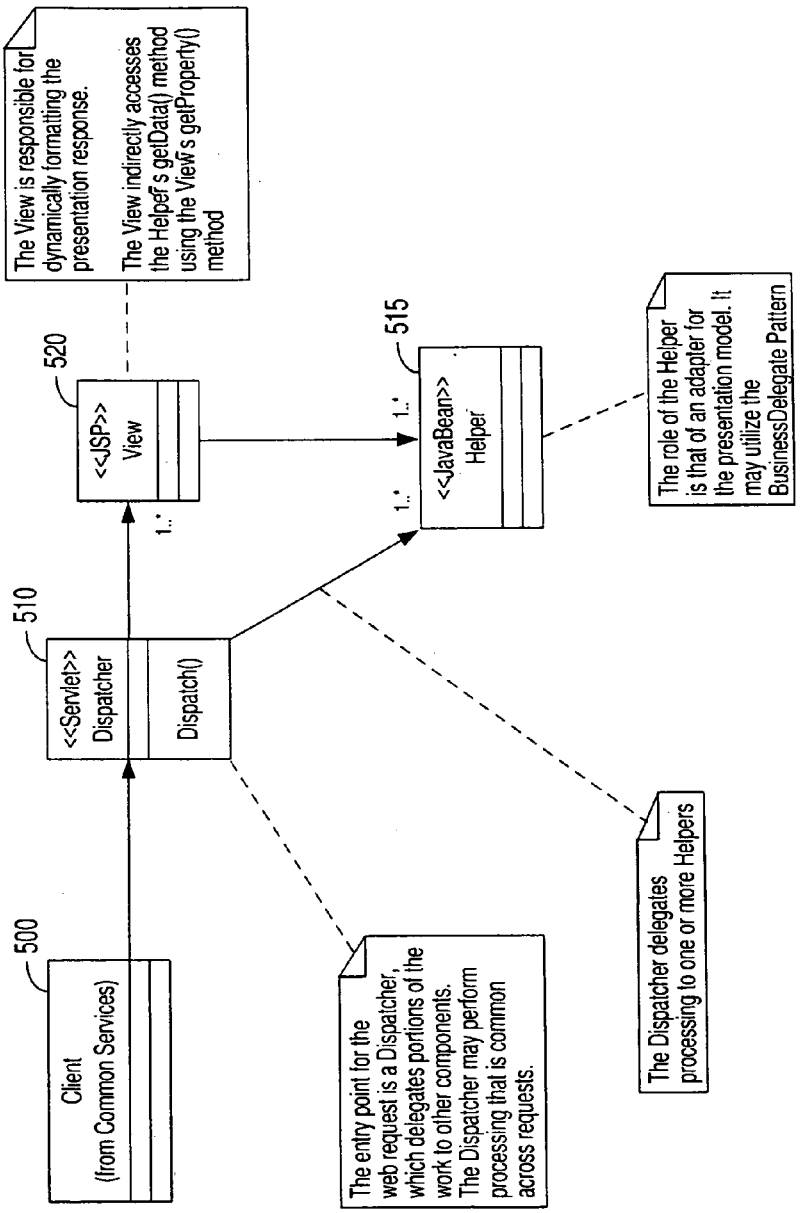
FIG. 5 is a flowchart of the operation of the service to workers design pattern according to an embodiment of the present invention.

The service to workers is a presentation design pattern that is configured to solve the problem of providing remote, web-enabled access to business services. Responses require server side processing for the formulation of a dynamic presentation in this context. The operation of the service to workers design pattern solution is described in connection with FIG. 5. First, a user makes a web request at step 500. The entry point for the request is a dispatcher, which delegates portions of the work to other components at step 510. The dispatcher may perform common processing before dispatching the request. The dispatcher delegates responsibilities to one or more helpers at step 515 before dispatching to the view at step 520, which dynamically formulates the presentation response.

The role of the helper is that of an adapter for the presentation model. The helper provides for a cleaner separation of roles, as a developer can maintain programming code and a web-production individual can maintain the presentation. The helper may utilize the related business delegate pattern to initiate the retrieval of required data. The business delegate reduces coupling among components on either side.

Mutable Conversational Business Entity

The mutable conversational business entity is a business/service hybrid design pattern configured to represent a business object using an entity. The business entity can be designed such that it has the responsibility of persistence and the ability to manage its attributes. The business logic can be coded in a separate session layer instead of the entity. The session layer can contain the ability to locate and manage the business entity.

The business object is divided into two classes, the business session which maps to one or more externalized methods and the business entity which retains the business object state. Access to the business object is via the business session. The business entity is not directly exposed to the clients.

The business entity has one or more attributes and exposes its attributes and methods (getters and setters) by means of as stateful business session. The business session can choose to expose only those getters and setters as necessary, and hide the others. In addition, business logic is coded in the business session. Thus, the business session can have as many business methods as required. The business entity is therefore a flat object that represents only the data (attributes) representing the underlying business object.

Figure 6:
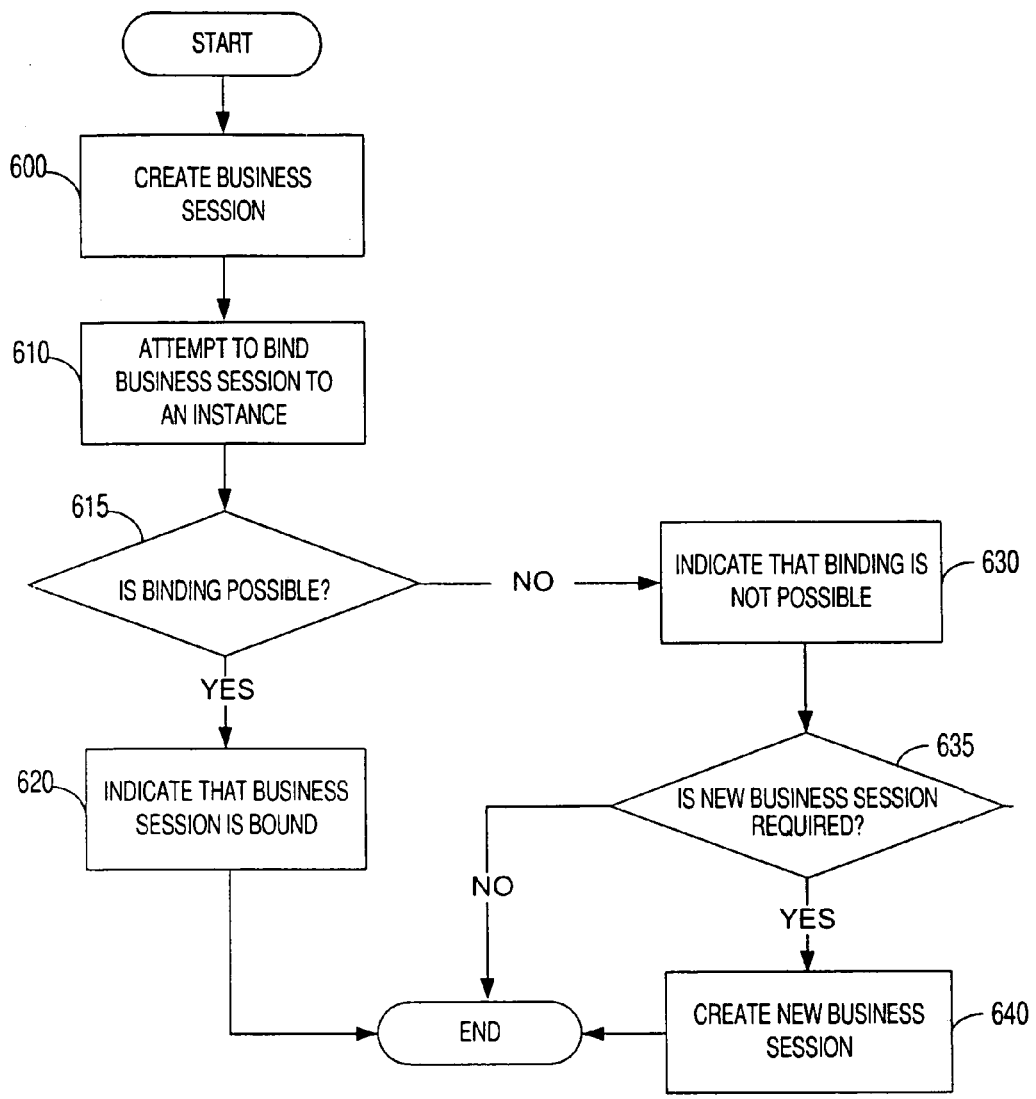
FIG. 6 is a flowchart of the operation of the mutable conversational business entity design pattern according to an embodiment of the present invention.

The business session needs to manage the access to the business entity. In addition, the business session needs to be able to create additional business entities per the client request. The business session being a stateful session will need to keep track of which instance of the business entity it is dealing with. To facilitate this management, one embodiment of the business session is provided with two methods setBoundToEntity( ) and isBoundToEntity( ). The manner in which these methods are used is described below in connection with FIG. 6.

A client first creates a business session at step 600. The initial business session remains without any binding to an entity instance. Then, the client attempts to bind the business session to an instance at step 610, for example by making a call to the bindToBusinessEntity( ) method in the business session and providing the method with the primary key that can uniquely identify the business entity instance.

Next, it is determined at step 615 whether the binding is possible. If the binding is possible, (i.e., the business session locates the required business entity instance), it is indicated at step 620 that the business session is bound to an instance, for instance by making a call to its private method called bindToBusinessEntity( ) which shows that it is ready to accept further client requests, thereafter, the algorithm terminates.

If the binding is not possible at step 615 (e.g., the required business entity instance does not exist), it is indicated at step 630 that the binding is not possible, for instance by initiating a BusinessEntityNotFoundException. If binding is not possible at step 630, it is determined at step 635 whether a new business session is required. If a new business session is not required, the algorithm terminates. Otherwise, if a new business session is required, the client creates a new business session at step 640. In one embodiment, a new business session is created by calling a createBusinessEntity( ) method to create a new instance of a business entity object, by providing the method with the primary key and the other attribute values that are required to create the business entity. Thereafter the algorithm terminates.

The following constraints apply to the mutable conversational business entity pattern. The business entity is to represent the business object and its attributes. The business entity should not contain any business logic. The business entity must not expose all its attributes (via getters and setters) to the client tier. The business logic is coded in a separate business session layer.

It is assumed for this design pattern that there is a 1—1 mapping of the attributes between the business object (domain representation not shown) and the business entity. The business entity is the implementation representation of the business object. The business object has attributes of basic types that are supported by the implementation language (e.g., a Java technology or other platform independent programming language) and the implementation database (e.g., Oracle) and there is a direct mapping between the language types and the database field types.

The following are the participants in the mutable conversational business entity pattern and their roles and responsibilities. There is an attribute that belongs to the business object definition and is represented as an attribute of the business entity. The business entity can have one or more attributes. Each attribute must be of a basic types that are supported by the implementation language (e.g., a Java technology or other platform independent programming language) and the implementation database (e.g., Oracle) and there must exist a direct mapping between the language types and the database field types.

The business entity is the implementation representation of the business object with all its attributes. This does not have any business logic associated with the business object. Rather the business logic is moved to the business session class.

Business session is the mediator object that controls interaction between the client and the business entity. The business session contains all the necessary business logic based on the business object requirements and can selectively expose the get and set methods of the business entity object. The business session is a stateful session that keeps track of the business entity it is managing for the client. The business session offers ways to create a new business entity if necessary.

A data accessor is a representation of the interface between the container that hosts the business entity and the database system in which the business entity persists. The use of a data accessor can be explicit in case of a business entity managed persistence (entity managed persistence) and can be implicit and transparent to the business entity developer in case of a container managed persistence.

The following pattern allows a clear separation of business logic and the persistent object. Some changes to the business entity may not need a change in the corresponding business session. All the attributes and the get/set methods are not exposed to the client layer, there by avoiding erroneous (intended or otherwise) operations on the business entity. If the method calls from the client are frequent (i.e., there is very short time gap between successive method calls to the business entity through the business session), this pattern is suitable as the business session retains the state.

Mutable Conversational Aggregator Business Entity

The mutable conversational aggregator business entity is a business/service hybrid design pattern which provides aggregation service for the business entity in order to attribute values into a single class. This enables the client to request the business entity to provide the entire values of its attributes packaged as a single class, thereby reducing the "chattiness" of the client (i.e., reduced remote calls from the client to the server).

Figure 12:
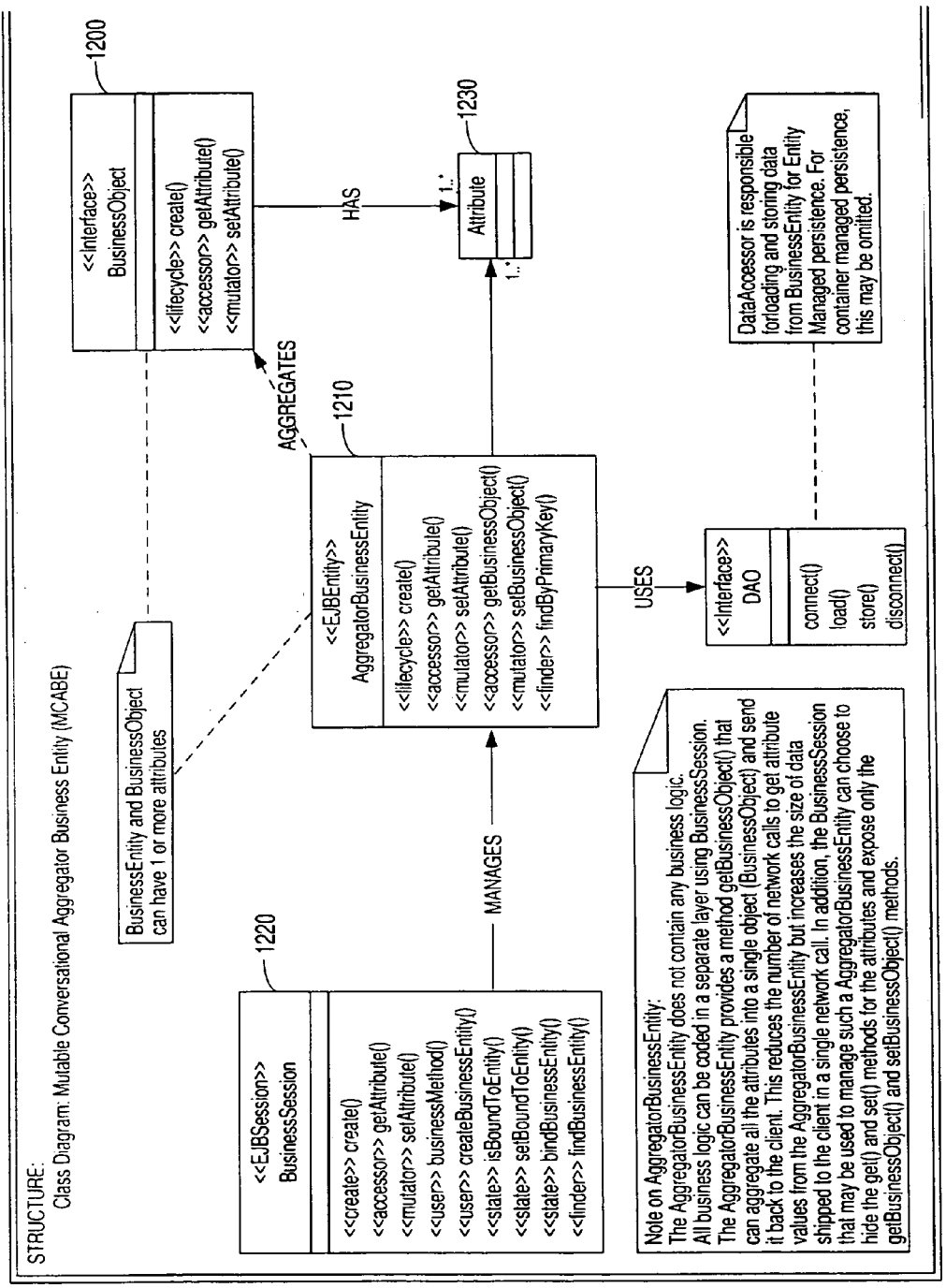
FIG. 12 is a diagram illustrating the mutable conversational aggregator business entity design pattern according to an embodiment of the present invention.

The solution provided by this pattern is divided into three classes shown in FIG. 12. The three classes are, business object 1200, aggregator business entity 1210, and business session 1220. The business object 1200 is defined as a separate class business object that contains all the attributes 1230 that need to be aggregated from the business entity. The aggregator business entity 1210 has the ability to construct a new business object and copy all the attribute values to the newly constructed business object. The business session 1220 maps to the externalized methods and has the ability to hide the aggregator business entity attributes and methods (including getters and setters) from clients. Access to the aggregator business entity and therefore the business object is via the business session 1220.

The aggregator business entity has one or more attributes and exposes its attributes and methods (getters and setters) to the business session. The business session can choose to expose only those getters and setters as necessary, and hide the others. In addition, business logic is coded in the business session. Thus, the business session can have as many business methods as required. The aggregator business entity is therefore a flat object that represents only the data (attributes) representing the underlying business object. The aggregator business entity acts as a builder for business object.

The following constraints apply to the mutable conversational aggregator business entity pattern. The aggregator business entity is used to represent the business object and its attributes. The aggregator business entity must not contain any business logic. The aggregator business entity must not expose all its attributes (via getters and setters) to the client tier. The client needs to reduce the number of network calls to get the data from the aggregator business entity. The aggregator business entity and business object have a 1—1 mapping of the attributes that are required to be part of the business object. Business logic is coded in a separate layer.

It is assumed that there is a 1—1 mapping of the attributes between the business object and the aggregator business entity. The aggregator business entity is the implementation representation of the business object whereas the business object acts as the data carrier representation for the business object. The business object has attributes of basic types that are supported by the implementation language and the implementation database and there is a direct mapping between the language types and the database field types.

The following are the participants in the mutable conversational aggregator business entity pattern and their roles and responsibilities. There is an attribute that belongs to the business object definition and is represented as an attribute of the business entity. The business entity can have one or more attributes. Each attribute must be of a basic types that are supported by the implementation language (e.g., a Java technology or other platform independent programming language) and the implementation database (e.g., Oracle) and there must exist a direct mapping between the language types and the database field types.

The business object is the data carrier (or aggregated object) representation of the business object with all its attributes. This does not have any business logic and has get and set methods for all its attributes. The aggregator business entity is the implementation representation of the business object with all its attributes. This does not have any business logic associated with the business object. Rather the business logic is moved to the business session class.

The business session is the mediator object that controls interaction between the client and the aggregator business entity. The business session contains all the necessary business logic based on the business object requirements and can selectively expose the get and set methods of the business entity object.

The data accessor is a representation of the interface between the container that hosts the aggregator business entity and the database system in which the aggregator business entity persists. The use of a data accessor can be explicit in case of a aggregate business entity managed persistence (bean managed persistence in a Java technology environment) and can be implicit and transparent to the aggregator business entity developer in case of a container managed persistence.

The mutable conversational aggregator business entity pattern causes a reduction in the number of network calls from the client to the service layer to obtain the required data represented by the AggregatorBusinessEntity. In this pattern, all the required data is obtained in a single network call. There is a clear separation of business logic and the persistent object. Some changes to the AggregatorBusinessEntity may not need a change in the corresponding BusinessSession. All the attributes and the get/set methods are not exposed to the client layer, thereby avoiding erroneous (intended or otherwise) operations on the AggregatorBusinessEntity. If the method calls from the client are frequent (i.e., there is very short time gap between successive method calls to the AggregatorBusinessEntity through the BusinessSession, this pattern is suitable as the BusinessSession retains the state.

Immutable Business Object Builder

Figure 7:
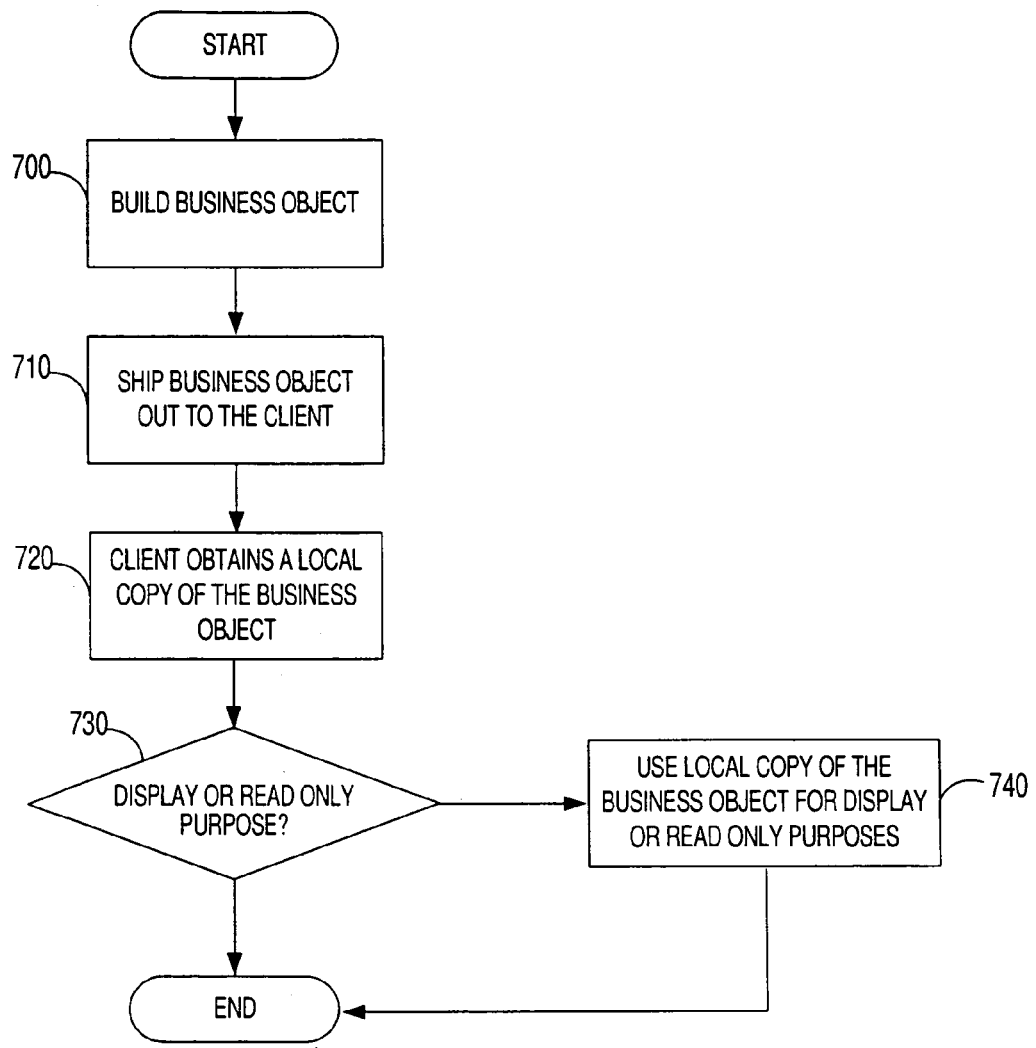
FIG. 7 is a flowchart of the operation of the immutable business object builder design pattern according to an embodiment of the present invention.

The immutable business object builder design pattern is a business/service hybrid design pattern which builds a business object using one or more business entity objects as the source. The immutable business object builder design pattern acts according to FIG. 7. At step 700 a business object is built. Next, at step 710, the business object is shipped out to the client, which reduces the number of network calls required to get the different attribute values from one or more business entity objects. Once the business object is shipped, the client obtains a local copy of it at step 720. Then, at step 730, it is determined whether the user wants to use the business object for display or read only purposes. If so, the business object is used for display or read only purposes at step 740.

The business object is represented as a separate class business object. The business entity is then mapped to the business object for each attribute. The business entity is accessed and managed by the business object builder which can be a stateless session. The business entity is not directly exposed to the clients. The business object builder provides a getBusinessObject( ) method which takes the arguments required to look up the required business entity and builds and returns the business object.

The following constraints apply to the immutable business object builder design pattern. The business object is the client representation of the business object. The business object must be built on demand and sent to the client as a single object. The business object can be constructed out of a single business entity object or multiple business entity objects. The business entity represents a single business object and its attributes. The business entity must not contain any business logic. The business entity must not expose all its attributes (via getters and setters) to the client tier. Business logic is coded in a separate layer.

It is assumed that there is a 1—1 mapping of the attributes between the business object and the business entity. The business entity is the implementation representation of the business object. The business object has attributes of basic types that are supported by the implementation language (e.g., a Java technology or other platform independent programming language) and the implementation database (e.g. Oracle) and there is a direct mapping between the language types and the database field types.

The following are the participants in the immutable business object builder design pattern and their roles and responsibilities. There is an attribute that belongs to the business object definition and is represented as an attribute of the business entity. The business entity can have one or more attributes. Each attribute must be of a basic types that are supported by the implementation language and the implementation database and there must exist a direct mapping between the language types and the database field types. The business object is the implementation representation of the business object with all its attributes. This does not have any business logic associated with the business object. The business logic can be represented in a separate layer using business session objects described in other patterns.

The business entity is the implementation representation of the business object with all its attributes. This does not have any business logic associated with the business object. Rather the business logic is moved to a separate layer using the business session objects described in other patterns. The business object builder is a mediator object that controls interaction between the client and the business entity. The business object builder contains all the necessary logic based to look up the required business entity and to construct a new business object based on the specified mapping.

The data accessor is a representation of the interface between the container that hosts the business entity database system in which the business entity persists. The use of a data accessor can be explicit in case business entity managed persistence (bean managed persistence in a Java technology environment) and can be implicit and transparent to the business entity developer in case of a container managed persistence.

Mutable Conversational Value Object Business Entity

The mutable conversational value object business entity pattern is a business/service hybrid design pattern which is configured to update persistent data using the value object pattern. Value objects are a preferable way to transfer data from a business entity to a client. By definition, value objects are fine grained and immutable. Typically they are retrieved by calling a getValueObject( ) method on a BusinessEntity. However, the there is currently no design pattern that says anything about how to make updates to the persistent store using the same method. The present design pattern proposes to include mutability into the solution to offer greater flexibility and usage.

Figure 8:
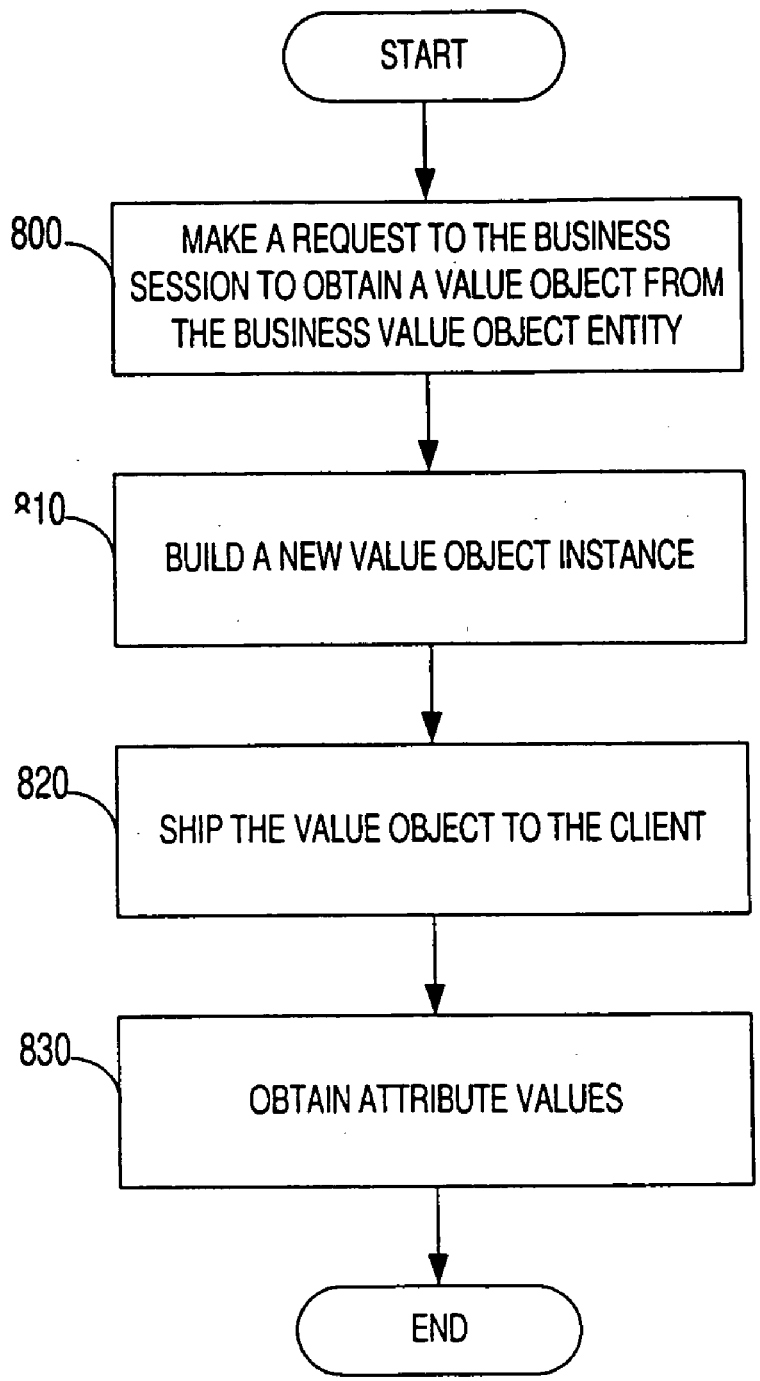
FIG. 8 is a flowchart of the operation of the mutable conversational value object business entity design pattern according to an embodiment of the present invention.

The pattern comprises a value object, a business value object entity, a business session, and a data accessor. The operation of these components is described in FIG. 8. First, at step 800, the client makes a request to the business session to obtain the value object from the business value object entity BVOE). The BVOE on receiving such a request (for instance, via the getValueObject( )) method proceeds to build a new value object instance that represents the current values of the various attributes of the BVOE at step 810. The BVOE can do this, for instance, by calling the value object constructor and passing on all the attribute values that need to be passed on back to the client. The value object is then shipped to the client at step 820.

Once the client gets the value object, it obtains the attribute values at step 830, for instance by calling the accessor methods. When the client wants to make an update to the BVOE using the value object, it can create a brand new value object instance and using the constructor, and populate the value object with those attributes that need to be updated. The remaining attributes can be set to null. The client can then invoke the update ValueObject( ) method and pass the value object instance it created. The BVOE loads and locks the corresponding row from a database table by using the SQL statement SELECT FOR UPDATE, for instance. The loaded version of the ValueObject is "merged" with the version from the client. The merging is performed by creating a new value object with the non-null values from the client's value object, and copying the remaining values from the loaded value object. Finally, the new value object is stored in the database and the row is unlocked.

The following constraints apply to this pattern. When there is a choice, a value object's attributes should be objects like integer, and not primitive data types like int. The constructor of the value object must be designed to assign all the value object's attributes corresponding to persistent data. The value object must not contain any set-methods.

The following are the participants in the mutable conversational value object business entity design pattern and their roles and responsibilities. A client needs the services of the BusinessValueObjectEntity. The BusinessSession is the service object that acts as a proxy to the BusinessValueObjectEntity to provide the required services. The BusinessValueObjectEntity represents the business entity and has the ability to package its attribute values into ValueObjects, and merge the values from the client's ValueObject into the entity attributes. The ValueObject is the aggregated object that contains the attribute values of the BusinessValueObjectEntity. The ValueObject acts as a data carrier object between the client and the entity object. The ValueObject once created and sent to the client is beyond the entity's control. The client can create a new ValueObject and provide it to the entity to update.

This pattern provides a complete mechanism for reading and writing persistent data between a Client and an Entity, for instance an EntityBean. A single SQL UPDATE statement can be used for all types of updates to a particular database table row, which is beneficial.

Immutable Conversational Business List Handler

The immutable conversational business list handler is a business/service hybrid design pattern configured to provide a Business List Handler to which the user can make business calls which returns a set or subset of the results. The client then traverses forward and backward through the result list. The pattern has a list processing facility that can retrieve query results. The processor then provides the results on demand. The pattern provides the flexibility of obtaining all the elements from the result set, a subset of elements from the result set, or just one element from the result set. The pattern further provides the ability to traverse the result set forward and backward by a certain number of elements to facilitate functions like page forward and page backward while displaying the search results.

The pattern comprises a BusinessListHandler session object that provides the facilities to cater to the requirement. The solution also includes a BusinessListIterator interface, BusinessList collection implementation, ListElement and DataAccessor. The BusinessListHandler implements the BusinessListIterator interface to provide for the list access and manipulation methods. The BusinessListHandler is responsible to execute the user query and obtain the results.

Figure 9:
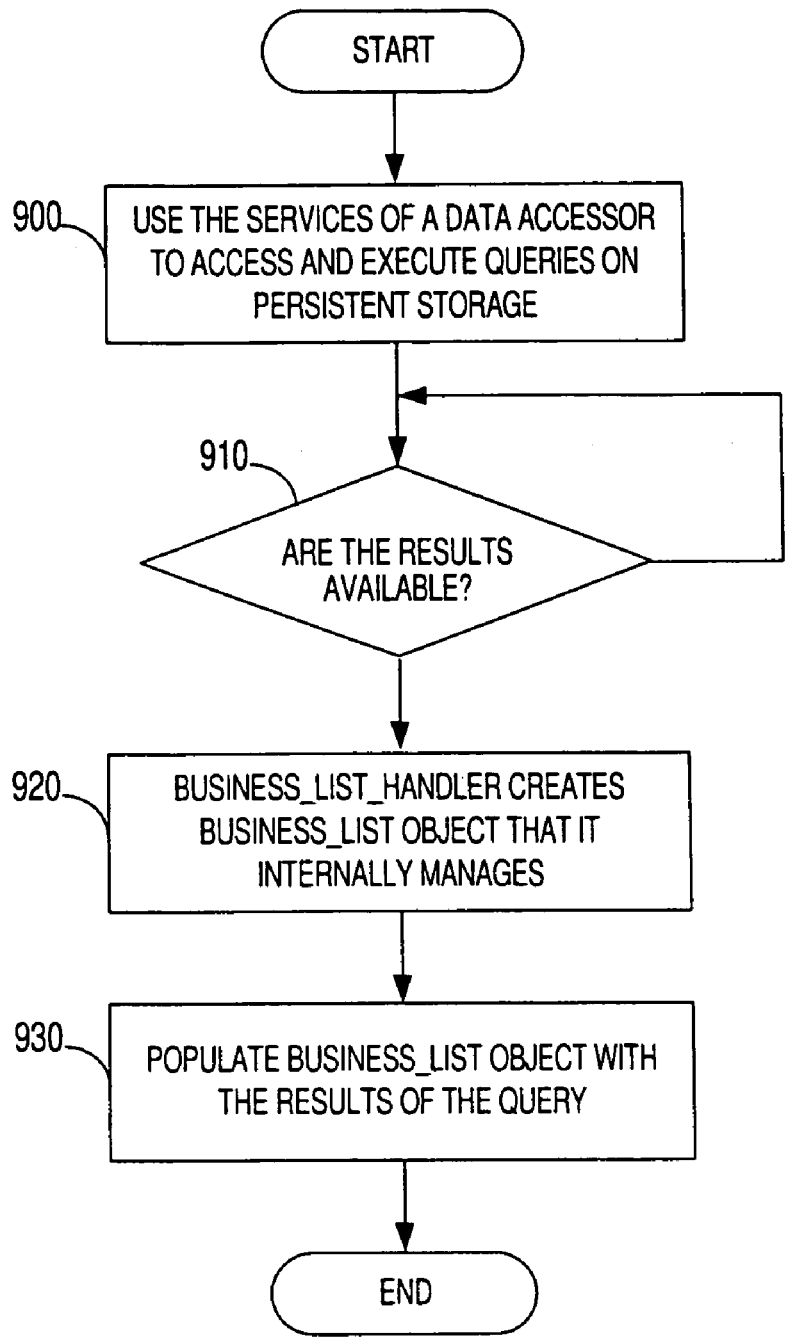
FIG. 9 is a flowchart of the operation of the immutable conversational business list handler design pattern according to an embodiment of the present invention.

The operation of the present design pattern is shown in the flowchart of FIG. 9. The BusinessListHandler uses the services of a DataAccessor object to access and execute the queries on the persistent storage at step 900. Then it is determined whether the results are available at step 910. If they are not, the pattern waits until the query has been satisfied. Once this occurs, the BusinessListHandler creates a BusinessList object that it internally manages at step 920. Then, at step 930, the BusinessList object is populated with the results obtained from the query execution. The BusinessList can hold any type of result object.

Figure 10:
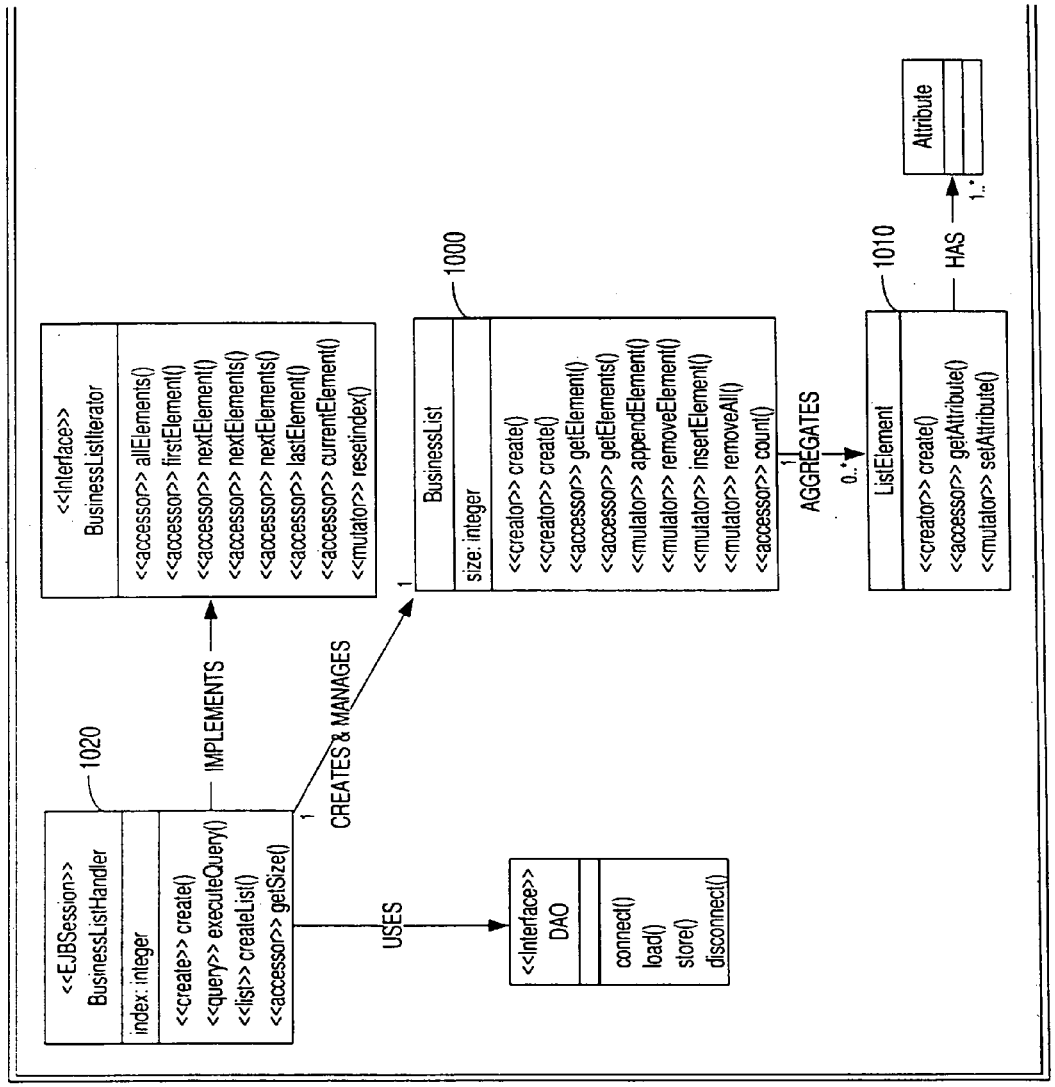
FIG. 10 is a diagram illustrating the immutable conversational business list handler design pattern according to an embodiment of the present invention.

The diagram of FIG. 10, illustrates that the ListElement can be an object with its own attributes, accessors and mutator methods. In FIG. 10, the BusinessList 1000 is shown holding a ListElement object 1010. After the query execution is successful, the BusinessListHandler 1020 is ready to serve its client. The client can request the BusinessListHandler for:

All the elements of the result set using allElements( );

First element in the result set using firstElement( );

Next element in the result set using nextElement( );

Sub-set of elements in the result set using nextElements (howMany), nextElements(fromIndextoIndex);

Last element in the result set using lastElement( ); and

Size (number of rows) of the result set using getSize( ).

The pattern facilitates queries via Session layer through the data access layer directly instead of searching for a list of entities. This means that there is a lot less overhead on the container which does not have to look up and load the entities. The BusinessListHandler can return only the results that the client needs. The client can use this list to present the queries and offer functionality like previous page and next page. The number of items to display on a page can be configured when the client requests the BusinessListHandler to return the results.

Business Delegate

Figure 13:
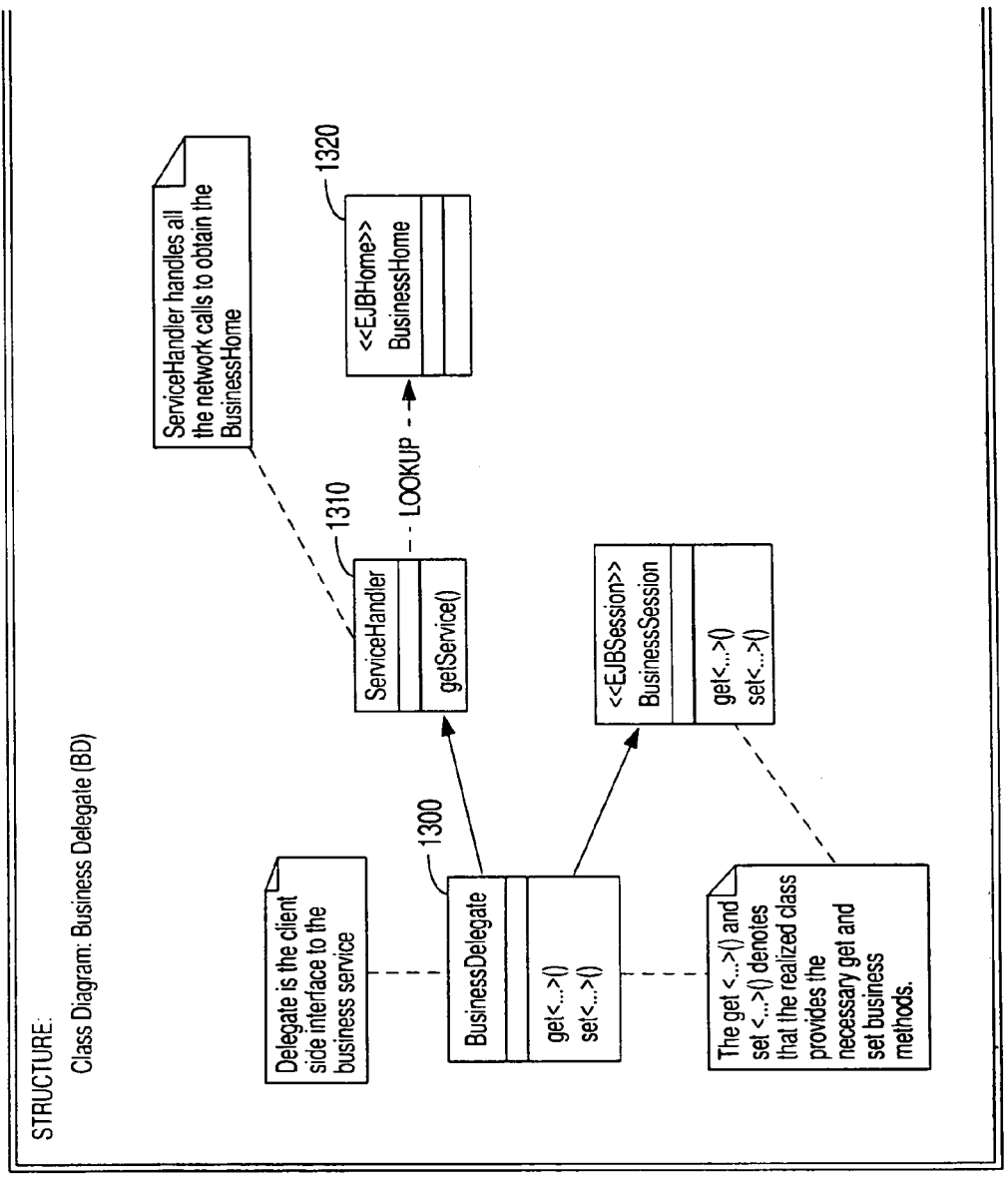
FIG. 13 is a diagram illustrating the business delegate design pattern according to an embodiment of the present invention.

The business delegate design pattern is a presentation/ business hybrid pattern configured to provide a client interface to business service. One embodiment of the business delegate pattern is shown in FIG. 13. A Delegate 1300 is used to provide control and protection for the BusinessService. The ServiceHandler 1310 obtains the network details from the Delegate and does all the work to lookup the BusinessHome 1320. The Delegate decouples the client from the service which protects the client from changes service as the APIs evolve.

Service Workflow Controller

Figure 14:
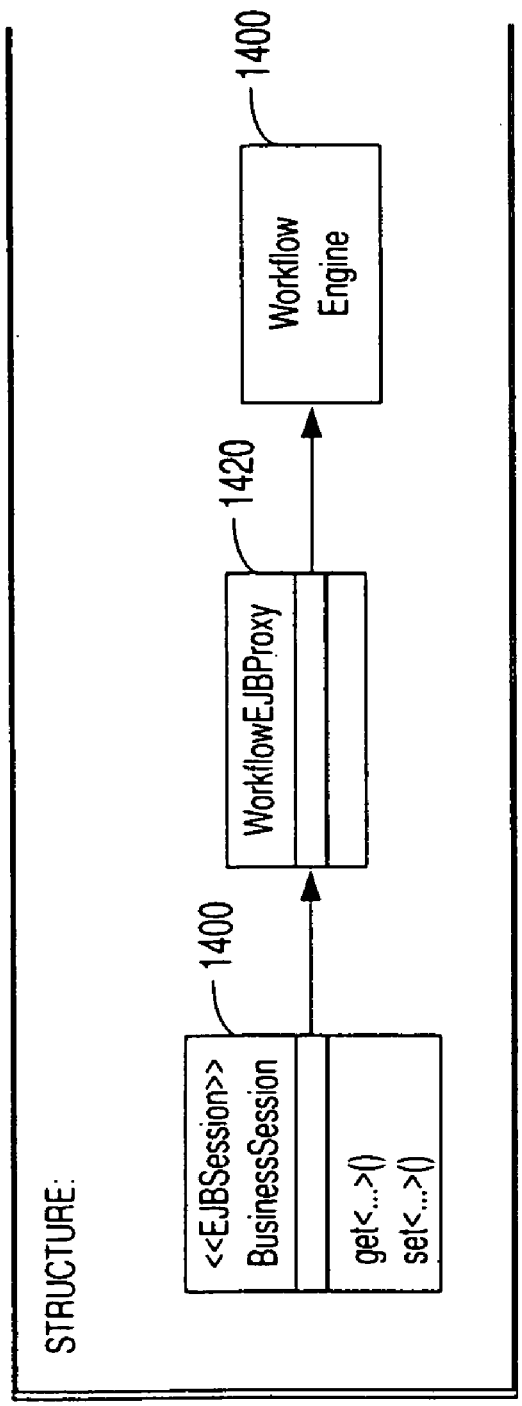
FIG. 14 is a diagram illustrating the service workflow controller design pattern according to an embodiment of the present invention.

The service workflow controller design pattern provides the ability for business service to be a participant in a workflow process. The Workflow Controller pattern addresses the problem of integrating enterprise Java beans into a workflow driven environment. An embodiment of a Workflow Controller pattern is shown in FIG. 14. The WorkflowEngine 1400 is the workflow component which drives the workflow. BusinessSession 1410 is the result of the workflow. The Workflow Enterprise Java bean proxy 1420 is responsible for mediating between the BusinessSession 1410 and the WorkflowEngine 1420. The WorkflowEJBProxy 1420 is a CORBA or RMI object which runs in a separate process. The WorkflowEngine 1420 represents the workflow process of a workflow engine. This pattern requires RM or CORBA to communicate between BusinessSession and the WorkflowEJBProxy. The pattern provides integration between EJB processing in a workflow driven environment.

Service Island Proxy Integrator

Figure 15:
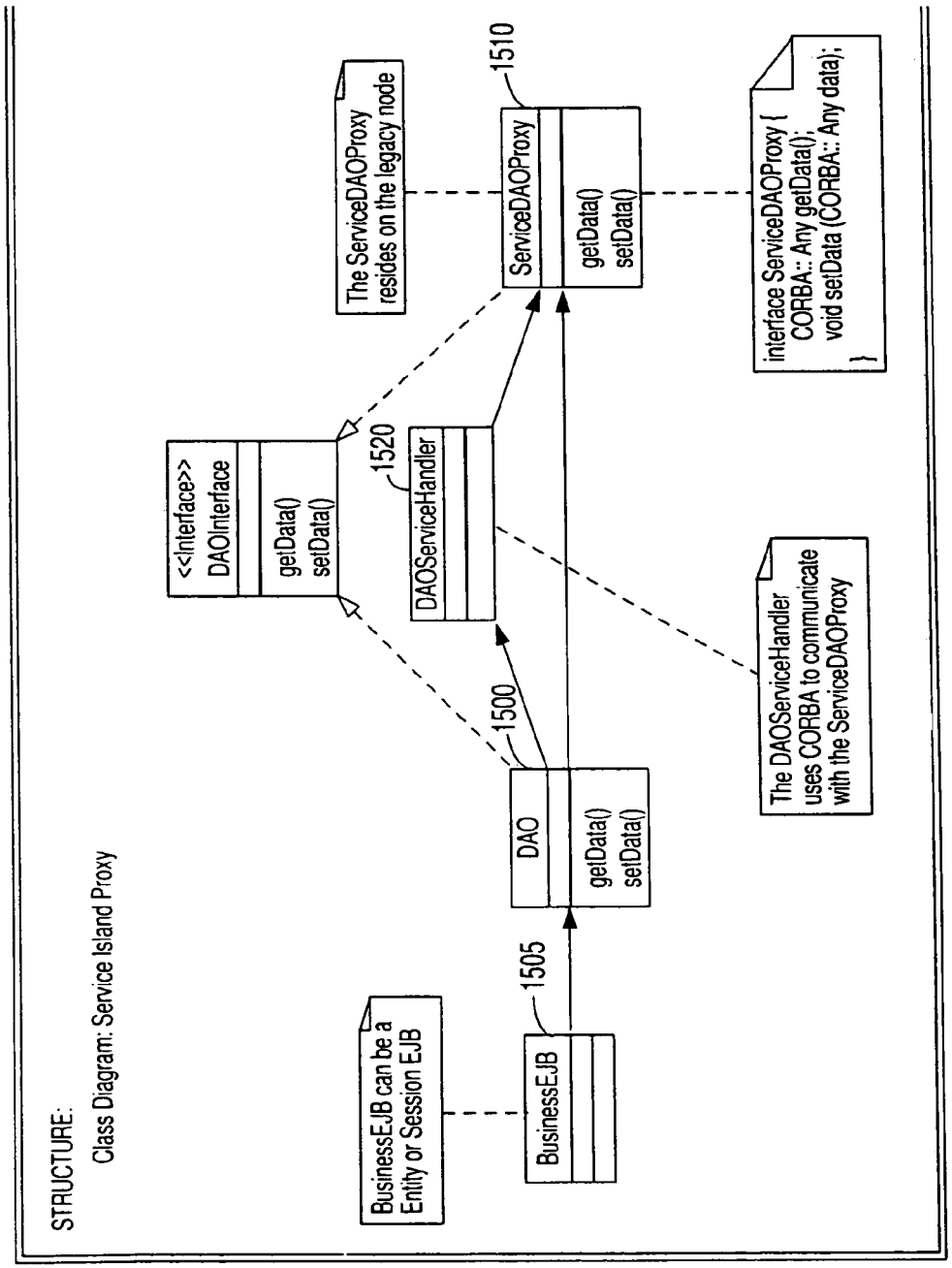
FIG. 15 is a diagram illustrating the service island proxy integrator design pattern according to an embodiment of the present invention.

The service island proxy integrator provides connectivity between EJB and a service which is not network accessible. The Service Island Proxy Integrator Pattern is used when there is a requirement to communicate with a service which does not provide network APIs. An embodiment of a service island proxy integrator is shown in FIG. 15. The DAO 1500 interfaces with BusinessEJB 1505 and communicates with the DAOServiceProxy 1510 after obtaining the DAOServiceProxy from the DAOServiceHandler 1520. The DAOServiceProxy interface is defined in a CORBA IDL. The DAOServiceHandler 1520 hides the CORBA IDL lookup details and returns the DAOServiceProxyto the DAO 1500.

Embodiment of Computer Execution Environment (Hardware)

Figure 11:
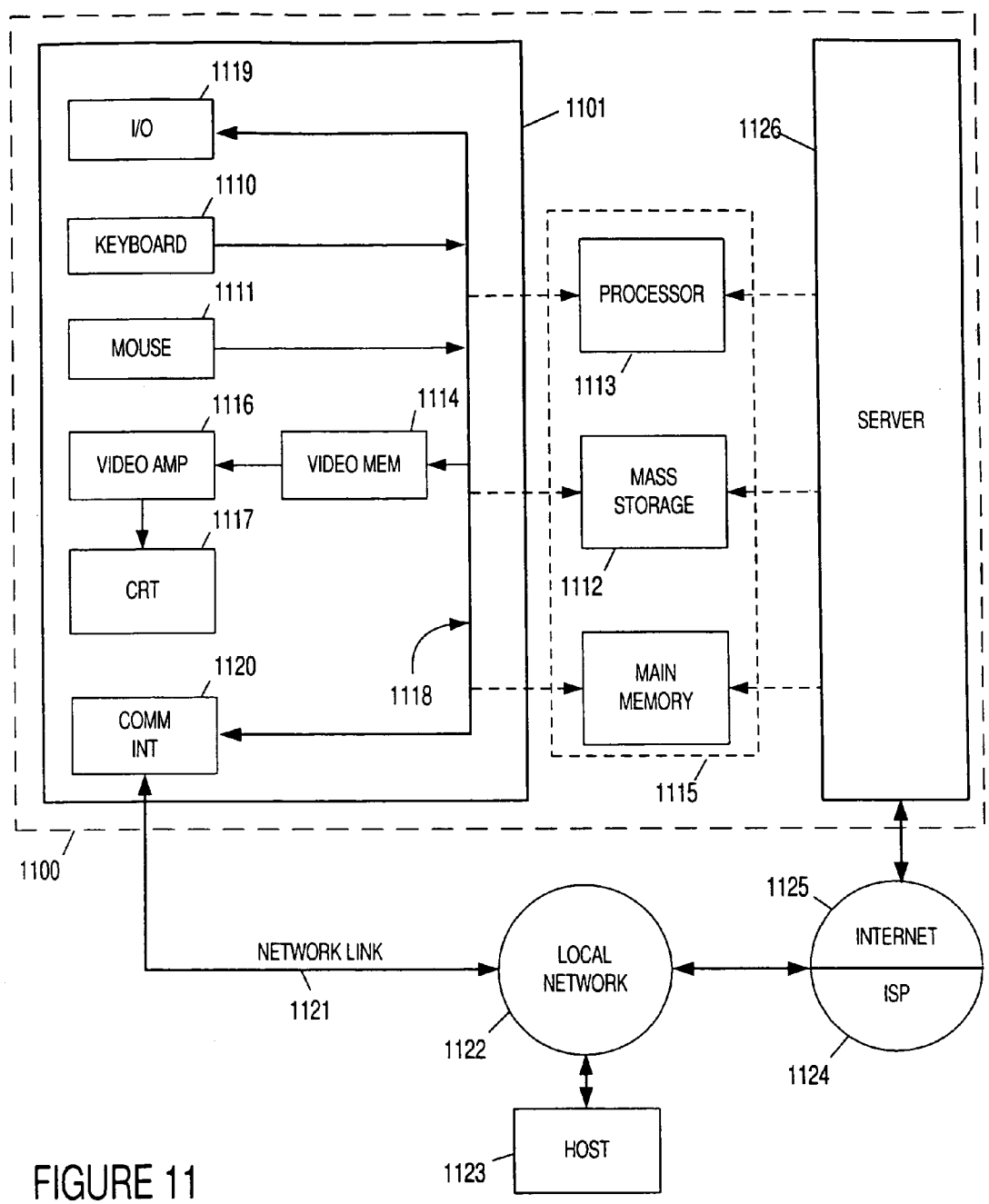
FIG. 11 is an embodiment of a computer execution environment in which one or more embodiments of the present invention can be implemented.

An embodiment of the invention can be implemented as computer software in the form of computer readable program code executed on a general purpose computer such as computer 1100 illustrated in FIG. 11, or in the form of bytecode class files executable within a Java™ run time environment running on such a computer, or in the form of bytecodes running on a processor (or devices enabled to process bytecodes) existing in a distributed environment (e.g., one or more processors on a network). A keyboard 1110 and mouse 1111 are coupled to a system bus 1118. The keyboard and mouse are for introducing user input to the computer system and communicating that user input to central processing unit (CPU) 1113. Other suitable input devices may be used in addition to, or in place of, the mouse 1111 and keyboard 1110. I/O (input/output) unit 1119 coupled to bidirectional system bus 1118 represents such I/O elements as a printer, A/V (audio/video) I/O, etc.

Computer 1100 includes a video memory 1114, main memory 1115 and mass storage 1112, all coupled to system bus 1118 along with keyboard 1110, mouse 1111 and CPU 1113. The mass storage 1112 may include both fixed and removable media, such as magnetic, optical or magnetic optical storage systems or any other available mass storage technology. Bus 1118 may contain, for example, sixty-four address lines for addressing video memory 1114 or main memory 1115. The system bus 1118 also includes, for example, a 64-bit data bus for transferring data between and among the components, such as CPU 1113, main memory 1115, video memory 1114 and mass storage 1112. Alternatively, multiplex data/address lines may be used instead of separate data and address lines.

In one embodiment of the invention, the CPU 1113 is a SPARC™ microprocessor from Sun Microsystems™, or a microprocessor manufactured by Motorola, such as the 680×0 processor, or a microprocessor manufactured by Intel, such as the 80X86, or Pentium processor. However, any other suitable microprocessor or microcomputer may be utilized. Main memory 1115 is comprised of dynamic random access memory (DRAM). Video memory 1114 is a dual-ported video random access memory. One port of the video memory 1114 is coupled to video amplifier 1116. The video amplifier 1116 is used to drive the cathode ray tube (CRT) raster monitor 1117. Video amplifier 1116 is well known in the art and maybe implemented by any suitable apparatus. This circuitry converts pixel data stored in video memory 1114 to a raster signal suitable for use by monitor 1117. Monitor 1117 is a type of monitor suitable for displaying graphic images.

Computer 1100 may also include a communication interface 1120 coupled to bus 1118. Communication interface 1120 provides a two-way data communication coupling via a network link 1121 to a local network 1122. For example, if communication interface 1120 is an integrated services digital network (ISDN) card or a modem, communication interface 1120 provides a data communication connection to the corresponding type of telephone line, which comprises part of network link 1121. If communication interface 1120 is a local area network (LAN) card, communication interface 1120 provides a data communication connection via network link 1121 to a compatible LAN. Wireless links are also possible. In any such implementation, communication interface 1120 sends and receives electrical, electromagnetic or optical signals which carry digital data links representing various types of information.

Network link 1121 typically provides data communication through one or more networks to other data devices. For example, network link 1121 may provide a connection through local network 1122 to host computer 1123 or to data equipment operated by an Internet Service Provider (ISP) 1124. ISP 1124 in turn provides data communication services through the world wide packet data communication network now commonly referred to as the "Internet" 1125. Local network 1122 and Internet 1125 both use electrical, electromagnetic or optical signals which carry digital data links. The signals through the various networks and the signals on network link 1121 and through communication interface 1120, which carry the digital data to and from computer 1100, are exemplary forms of carrier waves transporting the information.

Computer 1100 can send messages and receive data, including program code, in communication networks or a distributed environments, through network link 1121, and communication interface 1120, for example. In the Internet example, server 1126 might transmit a requested code for an application program through Internet 1125, ISP 1124, local network 1122 and communication interface 1120.

The received code may be executed by CPU 1113 (or other processing units in a distributed environment) as it is received, and/or stored in mass storage 1112, or other non-volatile storage for later execution. In this manner, computer 1100 may obtain application code in the form of a carrier wave.

The computer systems described above are for purposes of example only. An embodiment of the invention maybe implemented in any type of computer system or programming or processing environment.

Thus, a method and apparatus for developing enterprise applications using design patterns is described in conjunction with one or more specific embodiments. The invention is defined by the claims and their full scope of equivalents.

What is claimed is:

1. A method for providing a design pattern comprising:
providing a plurality of design patterns having differing types, each of the design patterns comprising a description of a design issue addressed by the particular design pattern and of a solution provided by the particular design pattern;
receiving input defining a programming problem;
determining a matching one of the types of design patterns based on the received input, wherein the matching one is determined by comparing the received input defining a programming problem with the descriptions of design issues for the plurality of provided design patterns;
providing a plurality of instances of said matching type of design pattern; and
receiving input indicating a selection of a member of the plurality of instances; and
returning the selected member of the plurality of instances.

2. The method of claim 1 wherein said differing types are selected from the group of pattern types consisting of a presentation, a business, a service, an integration, and a hybrid.

3. The method of claim 1 wherein said type is a hybrid.

4. The method of claim 3 wherein said hybrid is a business/service hybrid.

5. The method of claim 3 wherein said hybrid is a presentation/business hybrid.

6. The method of claim 3 wherein said hybrid is a business/integration hybrid.

7. The method of claim 1 wherein said member is a mediator view design pattern.

8. The method of claim 1 wherein said member is a service to workers design pattern.

9. The method of claim 1 wherein said member is a mutable conversational business entity design pattern.

10. The method or claim 1 wherein said member is a mutable conversational aggregator business entity design pattern.

11. The method of claim 1 wherein said member is an immutable business object builder design pattern.

12. The method of claim 1 wherein said member is a mutable conversational value object business entity.

13. The method of claim 1 wherein said member is a immutable conversational business list handler design pattern.

14. The method of claim 1 wherein said member is a business delegate design pattern.

15. The method of claim 1 wherein said member is a service workflow controller design pattern.

16. The method of claim 1 wherein said member is a service island proxy integrator design pattern, wherein the design issue comprises providing connectivity with a service that does not provide an application programming interface.

17. The design pattern locator of claim 16 wherein said member is a immutable conversational business list handler design pattern.

18. The method of claim 1, wherein each of the design patterns further comprises sample code for implementing the solution.

19. The method of claim 1, wherein each of the design patterns further defines participants in the particular design pattern including defining roles and responsibilities of the participants and defines constraints for the particular design pattern.

20. A design pattern locator comprising:
a determiner configured to identity a design pattern type from a plurality of types based on an input computing problem, wherein each of the design pattern types defines a problem addressed by the design pattern, a solution provided for the problem by the design pattern, and sample code, wherein said design pattern type is selected from the group consisting of a presentation type, a business type, a service type, an integration type, and a hybrid type;
a provider configured to display a plurality of instances of said design pattern type; and
a chooser configured to choose a member of said plurality of instances.

21. The design pattern locator of claim 20 wherein said design pattern type is a hybrid.

22. The design pattern locator of claim 21 wherein said hybrid is a business/service hybrid.

23. The design pattern locator of claim 21 wherein said hybrid is a presentation/business hybrid.

24. The design pattern locator of claim 21 wherein said hybrid is a business/integration hybrid.

25. The design pattern locator of claim 21 wherein said member is a mediator view design pattern.

26. The design pattern locator of claim 21 wherein said member is a service to workers design pattern.

27. The design pattern locator of claim 21 wherein said member is a mutable conversational business entity design pattern.

28. The design pattern locator of claim 21 wherein said member is a mutable conversational aggregator business entity design pattern.

29. The design pattern locator of claim 21 wherein said member is an immutable business object builder design pattern.

30. The design pattern locator of claim 21 wherein said member is a mutable conversational value object business entity.

31. The design pattern locator of claim 20 wherein said member is a business delegate design pattern.

32. The design pattern locator of claim 20 wherein said member is a service workflow controller design pattern.

33. The design pattern locator of claim 20 wherein said member is a service island proxy integrator design pattern, wherein the problem comprises providing connectivity with a service that does not provide an application programming interface.

34. A computer program product comprising:
a computer usable medium having computer readable program code embodied therein configured to locate a design pattern, said computer program product comprising:
computer readable code configured to cause a computer to provide a plurality of design patterns having differing types, each of the design patterns comprising a description of a design issue addressed by the particular design pattern and of a solution provided by the particular design pattern;
computer readable code configured to cause a computer to receive input defining a programming problem;
computer readable code configured to cause a computer to determine a matching one of the types of design patterns by comparing the received input with the design issues of the differing design pattern types;
computer readable code configured to cause a computer to provide a plurality of instances of said matching type of design pattern; and computer readable code configured to cause a computer to choose a member of said plurality of instances based on a received selection,
wherein said member is selected from the group of design patterns consisting of mediator view, service to workers, mutable conversational business entity, mutable conversational aggregator business entity, immutable business object builder, mutable conversational value object, immutable conversational business list handler, business delegate, service workflow controller, and service island proxy integrator.

35. The computer program product of claim 34 wherein said type is a presentation.

36. The computer program product of claim 34 wherein said type is a business.

37. The computer program product of claim 34 wherein said type is a service.

38. The computer program product of claim 34 wherein said type is an integration.

39. The computer program product of claim 34 wherein said type is a hybrid.

40. The computer program product of claim 39 wherein said hybrid is a business/service hybrid.

41. The computer program product of claim 39 wherein said hybrid is a presentation/business hybrid.

42. The computer program product of claim 39 wherein said hybrid is a business/integration hybrid.

* * * * *